United States Patent
Chiu et al.

(10) Patent No.: US 12,079,659 B2
(45) Date of Patent: Sep. 3, 2024

(54) SELECTION OF STREAM MANAGEMENT OPERATIONS BASED ON MACHINE LEARNING IN A DISTRIBUTED COMPUTING ENVIRONMENT

(71) Applicant: International Business Machines Corporation, Armonk, NY (US)

(72) Inventors: Henry Chiu, San Jose, CA (US); Bradley William Fawcett, Byron, MN (US); Jingdong Sun, Rochester, MN (US); Jason A. Nikolai, Rochester, MN (US); Paul Gerver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 17/122,197

(22) Filed: Dec. 15, 2020

(65) Prior Publication Data

US 2022/0188149 A1 Jun. 16, 2022

(51) Int. Cl.
*G06F 9/48* (2006.01)
*G06F 16/2455* (2019.01)
(Continued)

(52) U.S. Cl.
CPC ...... *G06F 9/4881* (2013.01); *G06F 16/24568* (2019.01); *G06F 16/2471* (2019.01);
(Continued)

(58) Field of Classification Search
None
See application file for complete search history.

(56) References Cited

U.S. PATENT DOCUMENTS

| 9,021,122 B2 * | 4/2015 | Branson | H04L 47/25 |
| | | | 709/234 |
| 9,363,198 B2 | 6/2016 | Ferris | |

(Continued)

FOREIGN PATENT DOCUMENTS

| CN | 104065663 A | 9/2014 |
| CN | 107241384 A | 10/2017 |

(Continued)

OTHER PUBLICATIONS

U.S. Appl. No. 17/122,197, Non US Response to SR-OA, UK Patent Application No. 2117265.5, Feb. 14, 2023, 16 pgs.
(Continued)

*Primary Examiner* — Abu Zar Ghaffari
(74) *Attorney, Agent, or Firm* — David K. Mattheis (57) ABSTRACT

Computer software that causes a stream processing management node to perform the following operations: (i) establishing data communication between the stream processing management node and a plurality of stream processing instances executing on respective computing environments in a multi-environment computing system; (ii) distributing one or more processing units of a stream processing job to a first set of stream processing instances of the plurality of stream processing instances; (iii) receiving, from the one or more stream processing instances of the first set of stream processing instances, processing results associated with the one or more processing units of the stream processing job; and (iv) performing a machine learning based stream management operation based, at least in part, on the received processing results.

18 Claims, 6 Drawing Sheets

(51) Int. Cl.
    *G06F 16/2458*     (2019.01)
    *G06N 20/00*     (2019.01)
    *G06F 16/2453*     (2019.01)
    *H04N 21/25*     (2011.01)

(52) U.S. Cl.
    CPC .............. *G06N 20/00* (2019.01); *G06F 9/48* (2013.01); *G06F 16/24532* (2019.01); *H04N 21/25* (2013.01)

(56) References Cited

U.S. PATENT DOCUMENTS

| | | | |
|---|---|---|---|
| 9,407,572 B2 | 8/2016 | Ferris | |
| 9,990,236 B2 * | 6/2018 | Zhang | H04L 67/60 |
| 10,776,711 B2 * | 9/2020 | Brand | G06N 20/00 |
| 2008/0304516 A1 * | 12/2008 | Feng | G06F 9/5038 370/468 |
| 2009/0319687 A1 * | 12/2009 | Goldstein | G06F 9/5083 709/241 |
| 2011/0214124 A1 | 9/2011 | Ferris | |
| 2013/0275452 A1 * | 10/2013 | Krishnamurthy | G06F 16/24532 707/764 |
| 2018/0308196 A1 | 10/2018 | Ray | |
| 2018/0321974 A1 | 11/2018 | Ferris | |
| 2018/0367631 A1 | 12/2018 | Son | |
| 2019/0082005 A1 * | 3/2019 | Ghare | H04L 65/61 |
| 2019/0354809 A1 * | 11/2019 | Ralhan | G06F 16/116 |
| 2019/0392353 A1 | 12/2019 | Liu | |
| 2020/0174840 A1 * | 6/2020 | Zhao | G06F 9/5011 |
| 2020/0202242 A1 * | 6/2020 | Doddi | G06N 20/00 |
| 2021/0049459 A1 * | 2/2021 | Sundararaman | G06N 3/04 |
| 2021/0092068 A1 * | 3/2021 | Ismailsheriff | H04L 47/2441 |
| 2021/0357256 A1 * | 11/2021 | Cao | G06F 9/5005 |
| 2021/0406086 A1 * | 12/2021 | Shivanna | G06F 9/505 |
| 2022/0067577 A1 * | 3/2022 | Serebryakov | G06N 3/084 |

FOREIGN PATENT DOCUMENTS

| | | |
|---|---|---|
| CN | 106961616 B | 3/2020 |
| CN | 114637771 A | 6/2022 |
| DE | 102021129637 A1 | 6/2022 |
| GB | 2604703 B | 5/2023 |
| JP | 2022094947 A | 6/2022 |

OTHER PUBLICATIONS

Mell et al., "The NIST Definition of Cloud Computing", Recommendations of the National Institute of Standards and Technology, Special Publication 800-145, Sep. 2011, 7 pages.
Combined Search and Examination Report under Sections 17 and 18(3), Applicant's file reference DB/P49955GB, Application GB2117265.5, Date of Mailing Jun. 29, 2022, 9 pgs.

* cited by examiner

SELECTION OF STREAM MANAGEMENT OPERATIONS BASED ON MACHINE LEARNING IN A DISTRIBUTED COMPUTING ENVIRONMENT

BACKGROUND

The present invention relates generally to the field of stream computing, and more particularly to distributing stream computing jobs across multiple computing environments.

Stream computing (also referred to as "stream processing," "streaming processing," "streams processing," and the like) is a known technique for performing queries on continuous streams of data, such as data from sensors, cameras, news feeds, and the like. In stream processing jobs, operators perform operations on data streams, where individual pieces of data within data streams are generally referred to as "tuples." Operators are generally contained within individual execution units, sometimes called "processing units" or "processing elements."

Stream computing systems can be implemented in a single computing environment, such as a single cloud computing environment or data center, and can also be implemented in distributed environments, where individual portions of stream processing jobs, such as processing elements, are distributed across multiple computing environments, such as multiple cloud computing environments operated by different cloud vendors.

SUMMARY

According to an aspect of the present invention, there is a method, computer program product and/or system that performs the following operations (not necessarily in the following order): (i) establishing, by a stream processing management node, data communication between the stream processing management node and a plurality of stream processing instances executing on respective computing environments in a multi-environment computing system; (ii) distributing, by the stream processing management node, one or more processing units of a stream processing job to a first set of stream processing instances of the plurality of stream processing instances; (iii) receiving, by the stream processing management node, from the one or more stream processing instances of the first set of stream processing instances, processing results associated with the one or more processing units of the stream processing job; and (iv) performing, by the stream processing management node, a machine learning based stream management operation based, at least in part, on the received processing results.

DETAILED DESCRIPTION

Stream computing is a growing field for near real-time data analysis. Many existing stream computing services and product offerings are designed to work in a single environment, such as a particular cloud computing environment or data center. However, enterprises or other entities may choose to run workloads in multi-cloud environments for a variety of reasons. Distributing stream computing workloads across environments allows enterprises to leverage capabilities from different vendors to optimize cost and performance, and also increases reliability through redundancy. Further, distributing stream computing workloads across cloud data centers in different geographical regions helps satisfy data sovereignty requirements, and reduces latency for users to access data. Various embodiments of the present invention provide a stream computing system configured for deployment across multiple cloud environments, modified to manage, optimize, improve problem determination for, and increase resiliency for stream computing workloads using various techniques, including machine learning.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
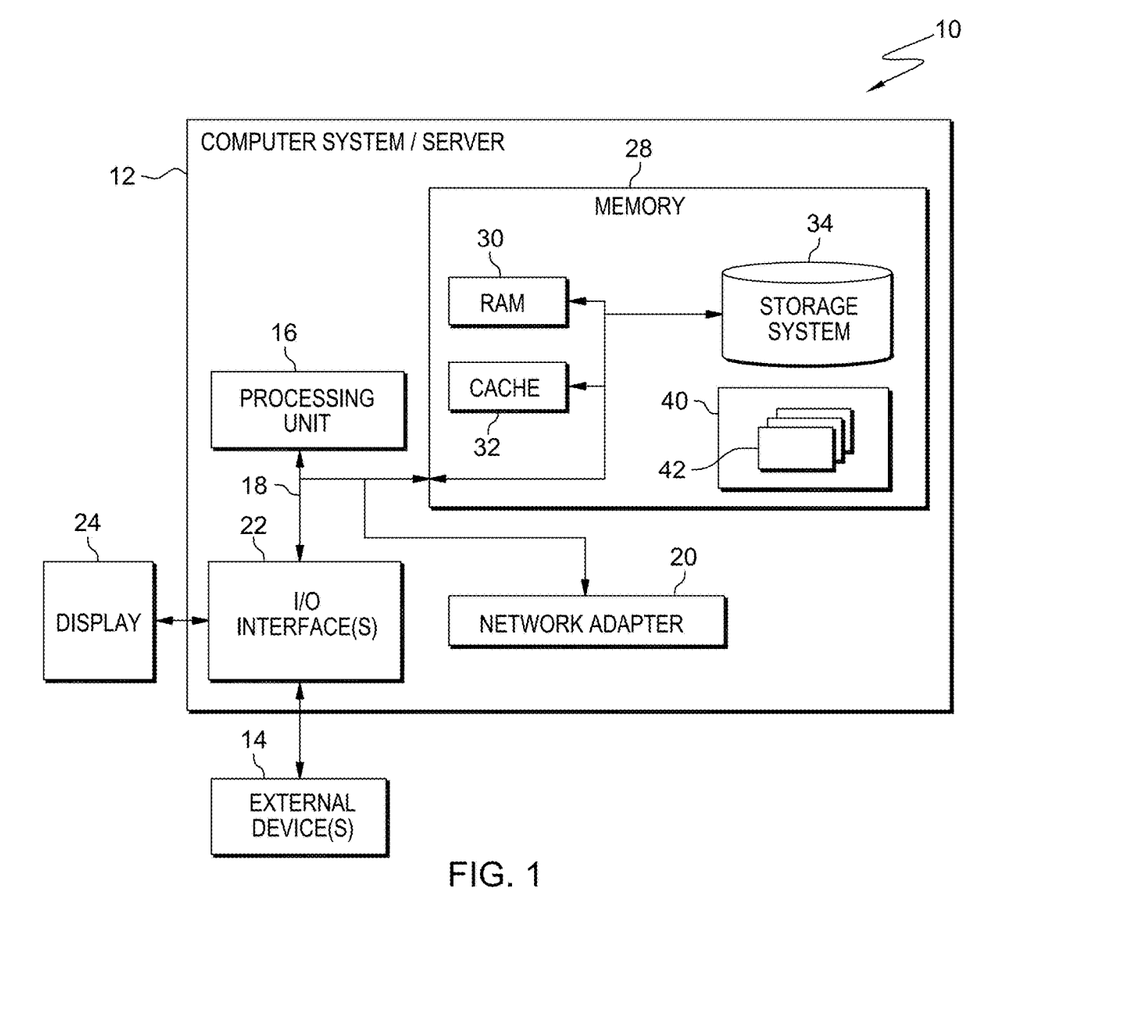
FIG. 1 depicts a cloud computing node used in a first embodiment of a system, according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
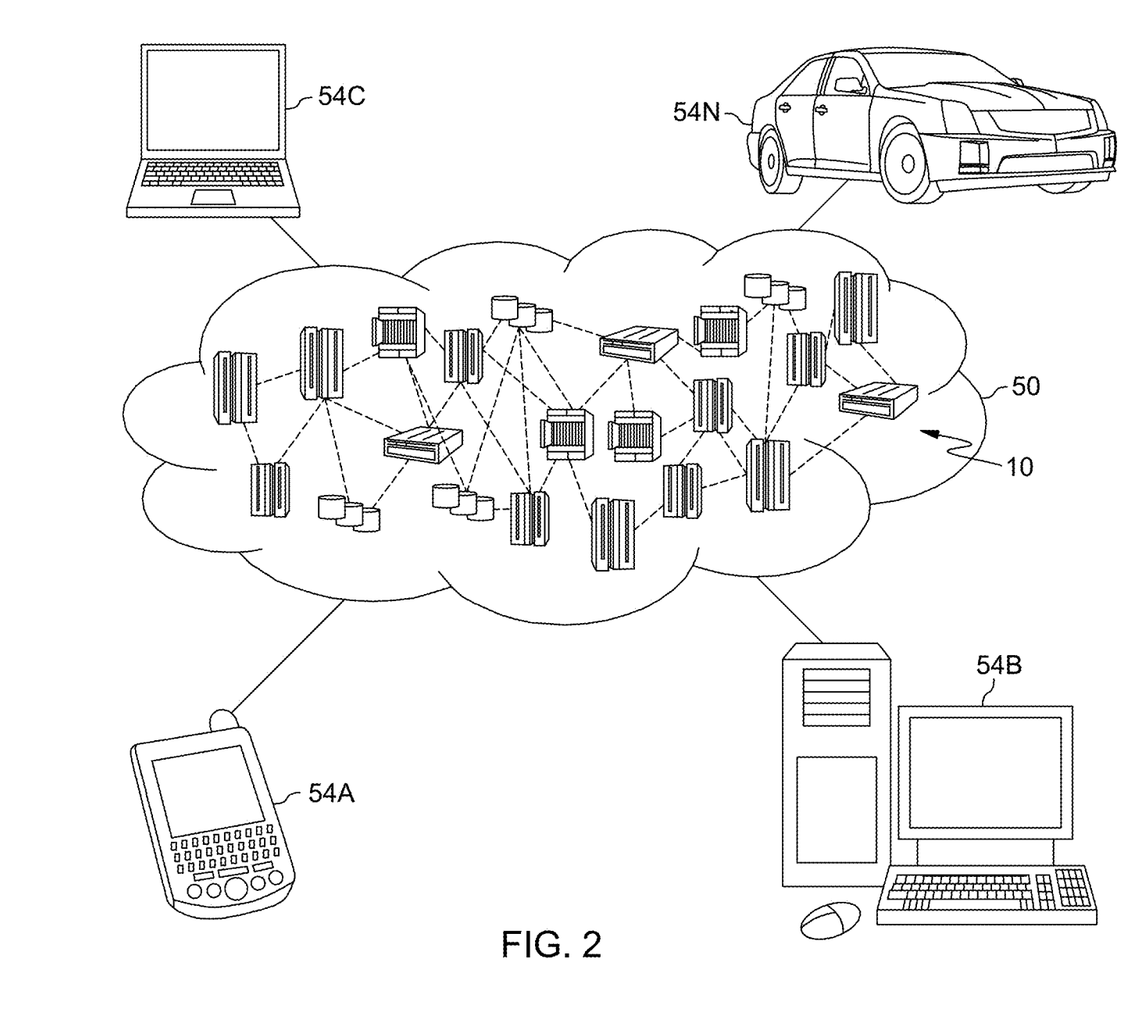
FIG. 2 depicts an embodiment of a cloud computing environment (also called the "first embodiment system"), according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
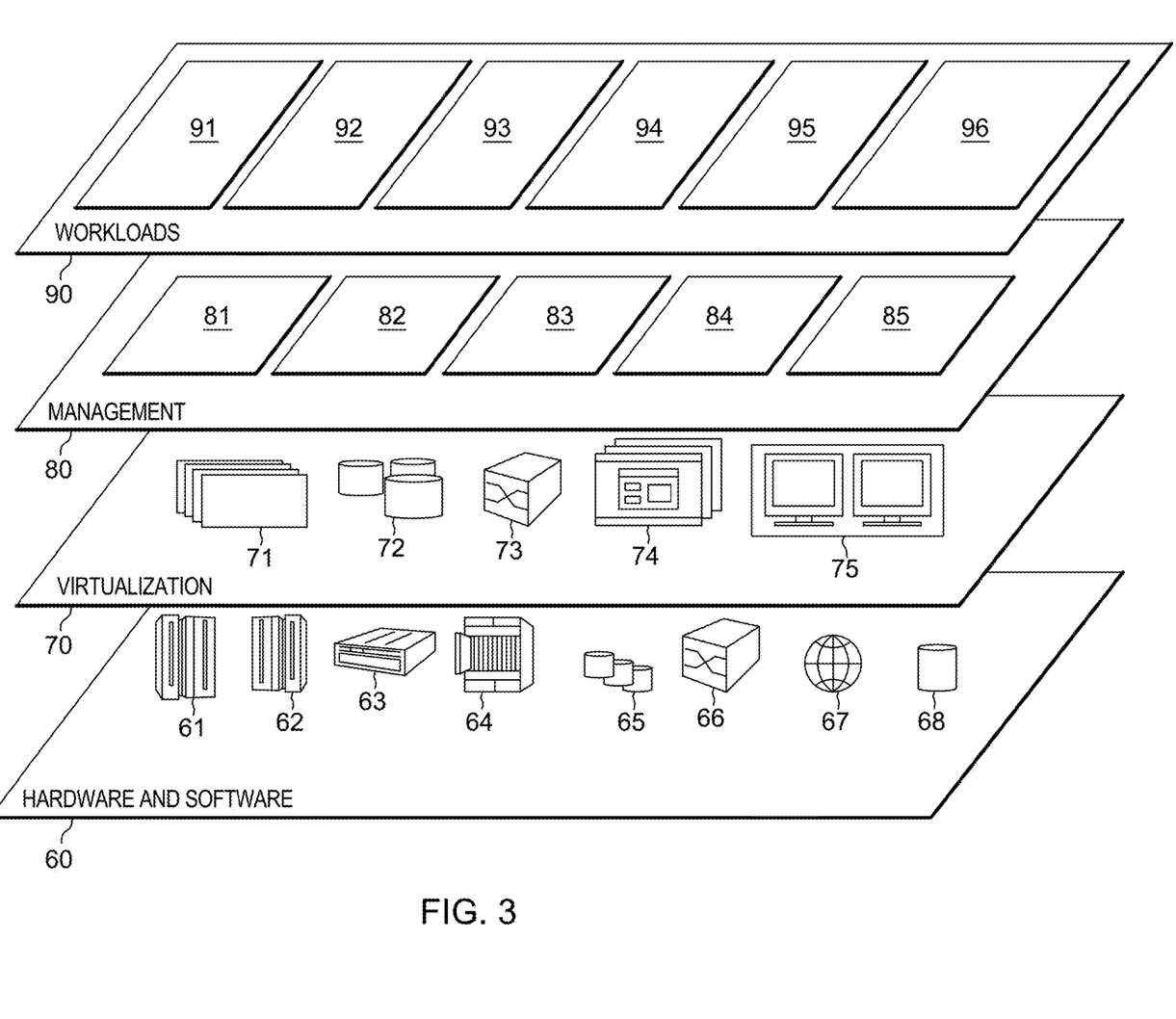
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stream processing management 96, as will be discussed in detail, below, in the following sub-sections of this Detailed Description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
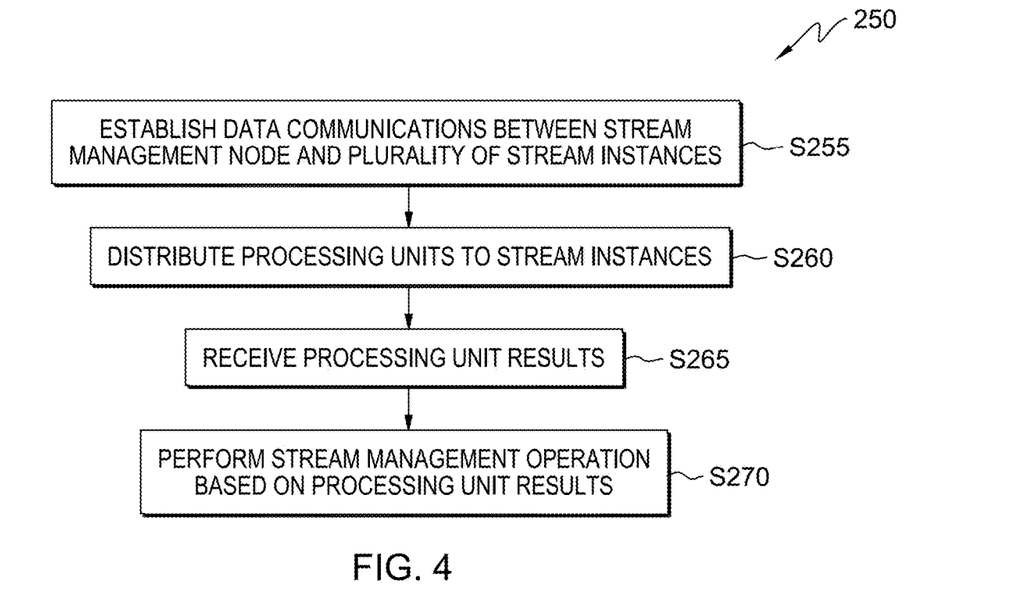
FIG. 4 is a flowchart showing a first embodiment method performed, at least in part, by the first embodiment system.
Figure 5:
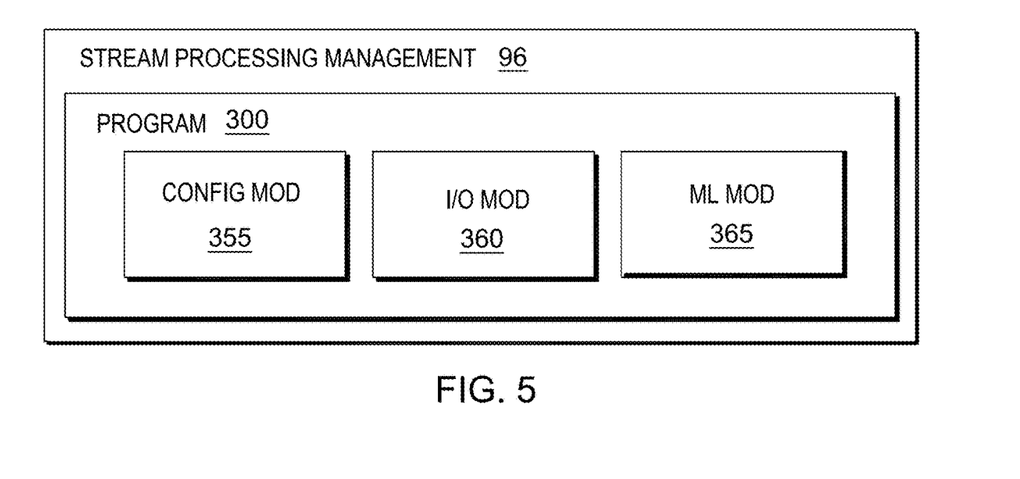
FIG. 5 is a block diagram showing a machine logic (for example, software) portion of the first embodiment system.

FIG. 4 shows flowchart 250 depicting a method according to the present invention. FIG. 5 shows program 300 of stream processing management 96 (see FIG. 3) for performing at least some of the method operations of flowchart 250. This method and associated software will now be discussed, over the course of the following paragraphs, with extensive reference to FIG. 4 (for the method operation blocks) and FIG. 5 (for the software blocks).

Generally speaking, in this example embodiment (also referred to in this sub-section as the "present embodiment," the "present example," the "present example embodiment," and the like), program 300—and, more broadly, stream processing management 96—performs management operations relating to the execution of one or more stream processing jobs. The stream processing jobs generally include processing units (or "processing elements") that can be distributed to various stream processing instances executing on various computing environments of a multi-environment computing system, such a multi-cloud system having cloud computing environments provided by at least two different cloud computing vendors. It should be noted that this example embodiment is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

While the discussion of the present example embodiment generally focuses on the processing units/elements as being the execution units of the stream processing job, it should be noted that the processing elements of the present embodiment may be replaced by any other capable stream processing execution units known or yet to be known in the art. For example, while stream processing operators that manipulate input streams of tuple data and produce corresponding output streams are typically contained within processing elements, the term "operator" can generally be substituted for the broader term "processing element" in many cases, as stream processing operations performed by a processing element will typically be performed by the respective operator(s) contained within that processing element.

Figure 7:
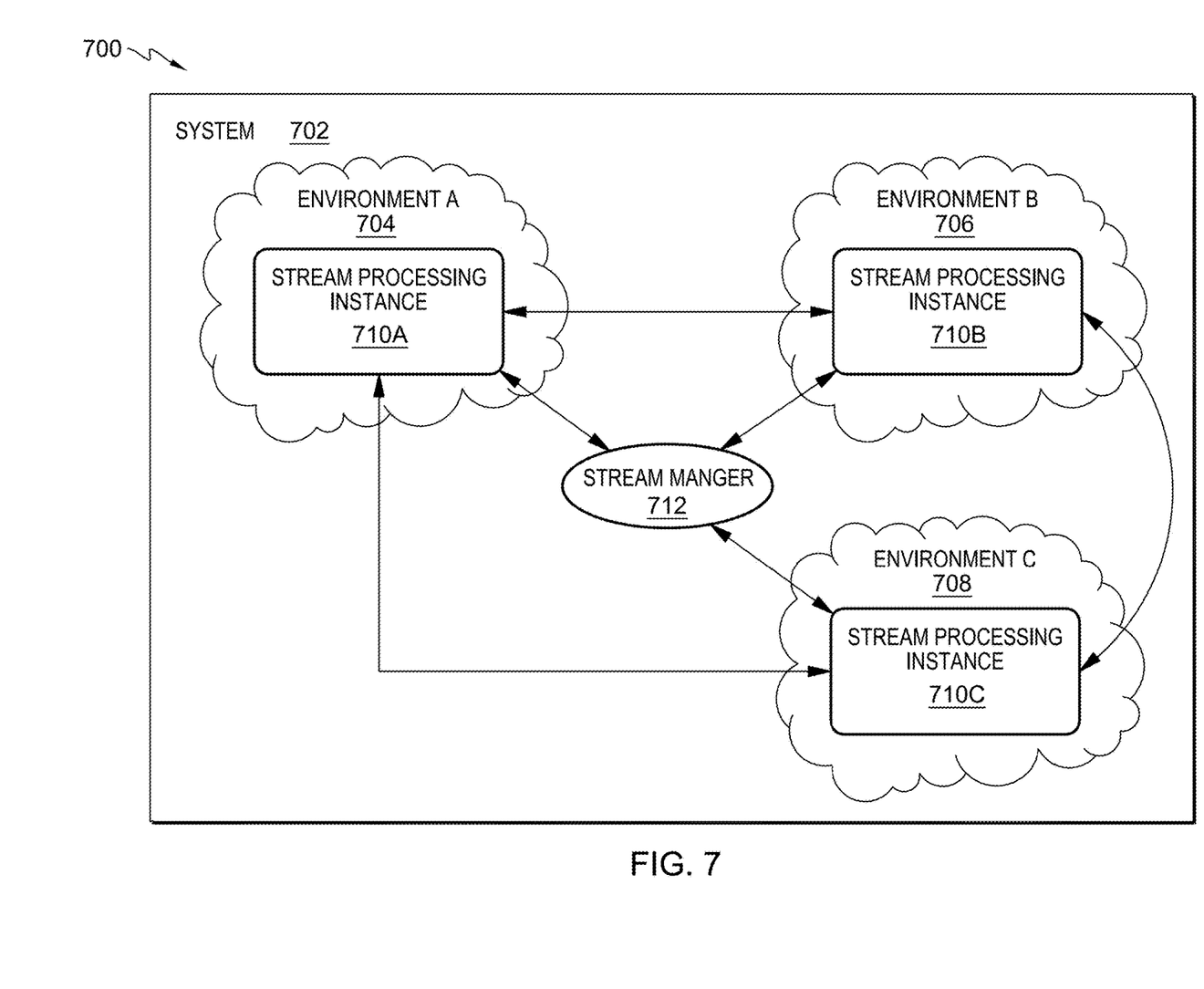
FIG. 7 is a diagram depicting an example of a multi-cloud stream computing environment, according to an embodiment of the present invention.

The processing elements of the stream processing job may be individually or collectively located on respective nodes (such as "stream processing instances") of cloud computing environment 50, whether physical or virtual. Furthermore, the processing elements of the stream processing job may also be located on nodes/stream processing instances of different environments, from vendors other than the vendor of cloud computing environment 50, for example. An example of such a configuration, having multiple cloud computing environments, is depicted in FIG. 7 and described below.

For purposes of this disclosure, a stream processing instance can be any computing construct capable of containing processing elements of stream processing jobs and having computing resources (such as CPU cores and memory) allocated to it for the processing of those stream processing jobs. In some embodiments, the stream processing instances are virtual machines. In other embodiments, the stream processing instances are cloud containers, such as Docker containers. In still other embodiments, the stream processing instances are Kubernetes pods (which themselves may contain one or more cloud containers). In still other embodiments, the stream processing instances include combinations of the above, or other known or yet to be known computing constructs meeting the above requirements. (Note: the term(s) "DOCKER" and/or "KUBERNETES" may be subject to trademark rights in various jurisdictions throughout the world and are used here only in reference to the products or services properly denominated by the marks to the extent that such trademark rights may exist.)

In the present example embodiment, program 300 of stream processing management 96 (also referred to as a "stream processing management node") communicates with a plurality of stream processing instances executing on respective cloud computing environments in a multi-cloud computing system, to manage the distribution of stream computing job processing elements across the various cloud computing environments, and to perform various other management related tasks. The interactions between the stream processing management node and the stream processing instances on the various cloud computing environments will be discussed over the course of the following paragraphs.

Processing begins at operation S255, where configuration ("config") module ("mod") 355 (see FIG. 5) establishes data communications between the stream processing management node and a plurality of stream processing instances. In this embodiment, the plurality of stream processing instances are stored in respective cloud computing environments of a multi-cloud computing system. For example, in one case: (i) a first stream processing instance is stored in a public cloud environment provided by a first cloud vendor; (ii) a second stream processing instance is stored in a private cloud environment provided by a second cloud vendor; and (iii) a third stream processing instance is stored in a hybrid cloud environment provided by a third cloud vendor. By establishing data communications between the stream processing management node and the stream processing instances of the respective cloud environments, mod 355 of program 300 is able to configure the respective stream processing instances to operate as if they were all operating in the same, singular cloud computing environment. For a discussion of ways in which the various environments can be created and configured to interact with each other—for example, with respect to a particular stream processing job—see the Further Comments and/or Embodiments sub-section of this Detailed Description, below.

Processing proceeds to operation S260, where I/O mod 360 distributes one or more processing units of a stream processing job to a first set of stream processing instances of the plurality of stream processing instances. That is, in this operation, program 300 (e.g., via config mod 355) identifies a stream processing job to be performed, identifies the corresponding processing elements for the job, determines which of the stream processing instances to assign which processing elements to, and uses I/O mod 360 to communicate those assignments and their associated data to the respective stream processing instances. The initial distribution of processing units to stream processing instances can be based on any number of a wide variety of factors, ranging from specific rules based on processing and/or memory requirements to an assessment of the associated costs with using each of the available stream processing instances. Furthermore, while the processing units generally need to be distributed to at least one stream processing instance for execution, any number of possible combinations of stream processing instances may be used, and in some cases, a single processing unit may be assigned to multiple stream processing instances for redundancy and/or to spread out a particular workload across multiple instances/environments. Again, for a further discussion of how embodiments of the present invention distribute processing units to stream processing instances, see the Further Comments and/or Embodiments sub-section of this Detailed Description, below.

Processing proceeds to operation S265, where I/O mod 360 receives, from the one or more stream processing instances of the first set of stream processing instances, processing results associated with the one or more processing units of the stream processing job. The processing results can include any data relating to the processing of the stream computing job by the respective stream processing instances, including various data processing results (e.g., operator results), system information for the stream processing instances (e.g., processing power, memory available), and/or various analytics, as will all be discussed in further detail below, both in this sub-section and in the Further Comments and/or Embodiments sub-section of this Detailed Description.

Processing proceeds to operation S270, where config mod 355 performs a stream management operation utilizing machine learning (ML) mod 365 and based, at least in part, on the received processing results. Any number of a wide variety of stream management operations may be performed in this operation, including, for example, the distribution of processing units for a new stream processing job, the re-distribution of processing units for the current stream processing job, and the use/modification of parallel regions for the a stream processing job, as will be discussed below.

In various embodiments, the stream management operation is based on machine learning—that is, the stream management operation is selected using a machine learning based selection strategy. In various embodiments, a machine learning model is trained to make this selection by utilizing the received processing results as at least part of the training data for a training process. The training process may be any of a wide variety of training processes, for example: (i) a supervised training process, such as a process that uses labels for the training data, where the labels are received from a human user, a digital annotator, or a combination thereof; (ii) an unsupervised process, such as a process that uses a cluster analysis or a principal component analysis to identify patterns in the training data; (iii) a reinforcement learning process, such as a process that utilizes a Markov decision process and/or dynamic programming techniques; and/or (iv) combinations thereof.

Generally speaking, a purpose of the training process, regardless of the specific type of process being employed, is to produce results that satisfy a particular objective or set of objectives. In the case of the present embodiment, where the machine learning model is being used to select various stream management operations, the machine learning model is trained to select stream management operations based on how well they meet those objectives. The objectives may be any one or more of a wide variety of possible objectives—whether technical or business in nature. For example, some general technical objectives may include: (i) keeping CPU load to a minimum, or under a certain amount, (ii) keeping RAM utilization to a minimum, or under a certain amount, (iii) minimizing an amount of "wait time" for processing units, and/or (iv) maximizing throughput (for example, tuple outflow rate). Some general business objectives include: (i) cost in general, (ii) cost as applied to certain timeframes (e.g., during off-hours, at the end of a month/quarter), (iii) minimizing use during certain "peak" or otherwise undesired timeframes, (iv) data sovereignty requirements of various legal jurisdictions; and/or (v) minimizing processing cost while still maintaining a defined Quality-of-Service (QoS) performance rating.

Various other factors relating to the optimization of a stream management job may also be considered in the training of the machine learning model. For example, in various embodiments, the machine learning model may be trained to optimize how external services—such as databases—are accessed. In these embodiments, if a stream processing job needs access to a database, for example, the machine learning model can be trained to identify which computing environment can access the database with optimal cost and performance levels. Another factor that may be considered is proximity to source data. For example, if input data for a stream processing job originates from a network of sensors in a region, the computing environment closest to that region may be selected for processing, as that computing environment may have the most favorable cost and performance metrics for that job. Yet another factor that may be considered is computing environment stability. For example, the machine learning model can be trained to identify which computing environment has the least number of outages over time, and choose that environment to run critical processing units for a job.

As mentioned above, in various embodiments, the stream management operations fall into three general categories: initial distribution/assignment of processing units for a new stream processing job, re-distribution of processing units for a current stream processing job, and the use/modification of parallel regions for the stream processing job. For example, in various embodiments, the stream management operation includes distributing one or more processing units of a new stream processing job to a different set of stream processing instances than those used in the initial stream processing job. In these embodiments, the different set of stream processing instances may include some overlap with the initial set of stream processing instances used for the initial stream processing job, but that will not always be the case, as in many situations the set of objectives may be best satisfied by using different stream processing instances entirely. Furthermore, in some cases, the stream processing management node may identify that none of the available stream processing instances are suitable for meeting the objectives for the stream processing job, and may issue requests to the various cloud computing environments of the multi-cloud computing system to create new stream processing instances with specifications that meet, or are more likely to meet, the objectives.

As stated above, in various embodiments, the stream management operation includes instructing the movement of a first processing unit of the distributed one or more processing units from a first stream processing instance to a second stream processing during the execution of the stream processing job. In various embodiments, similar determinations to those discussed in the preceding paragraph may be made, such as reassigning some, but not all, of the processing units, or requesting the creation of one or more new stream processing instances that better meet the desired objectives. In addition, the determination of whether to move a processing unit between stream processing instances can also depend on real-time metrics of how the stream processing job is being executed. For example, if ML mod 365 determines, based on real-time processing results received by I/O mod 360, that the first stream processing instance is no longer going to meet a cost objective by a certain amount, config mod 355 may instruct the redistribution of one or more of the processing elements of the first stream processing instance to a second stream processing instance that will process the processing elements at a cost that is at least less than the cost of the first stream processing instance by the certain amount, so that the total combined cost of processing using the first stream processing instance and the second stream processing instance meets the cost objective. In another example, if the real-time processing results indicate that first stream processing instance has been terminated, or is likely to be terminated, ML mod 365 may re-distribute the processing elements of the first stream processing instance to one or more other available stream processing instances that have not been terminated or are not likely to be terminated.

Finally, as stated above, in various embodiments, the stream management operation includes the use/modification of parallel regions for the stream processing job. Generally speaking, parallel regions allow a stream processing job to replicate specific operators within processing units/elements, split the streams going into those operators, and process different tuples in parallel in the replicated operators, where the replicated operators and their respective streams are considered to be "parallel regions" or "channels." For instance, one example of a stream management operation involving parallel regions would be to increase the width of a parallel region, replicating the operators even further so that more parallel regions are created. In various embodiments, the parallel regions may all remain within the same processing unit, and in other (or the same) embodiments, the parallel regions may be distributed to different processing units and/or stream processing instances as desired/required to meet the identified objectives. As such, in some cases, the stream management operation includes ML mod 365 determining that more channels are needed and instructing the creation of one or more new channels associated with a particular operator to be executed on a new (e.g., third) set of stream processing instances.

III. Further Comments and/or Embodiments

Various embodiments of the present invention provide a system for distributing stream computing workloads across multiple cloud computing regions and vendors. For example, in some embodiments, a stream manager incorporates the following techniques to better manage streaming workloads running in multiple clouds: (i) consolidation—centralized, remote administration of instances and job objects in multiple clouds; (ii) problem determination—deeper integration with cloud and system monitoring tools; (iii) high availability—instance and job failover across clouds; and/or (iv) optimizing cost and job performance through machine learning, including job submission to a cloud, job movement across clouds, and expanded parallel regions and other programming concepts to run channels in optimal cloud configurations.

In various embodiments, a multi-cloud stream manager learns the best, or optimal, cloud environment to run specific jobs. In various embodiments, to determine the best cloud environment to run streaming workloads, the stream manager continuously gathers cost rates and performance metrics. These metrics are used to determine which optimal cloud environment a stream computing job is submitted to, when a job should be relocated to a different cloud environment, and when programming technologies, including parallel regions, should be used to run a job on multiple clouds.

In various embodiments, where a stream computing job is being run is hidden from an end user. In various embodiments, the end user or developer will simply use or write a distributed stream computing application. In various embodiments, the developer deploys the application to a multi-cloud stream manager which places the jobs of the application to optimally meet goals (or Service Level Agreements (SLAs)). In various embodiments, debugging and consolidated view technology are incorporated for administrators and developers debugging applications from a single pane or portal. From the perspective of the end user, the application runs as the application ran in a single location, and the multi-cloud distribution is invisible.

Figure 6:
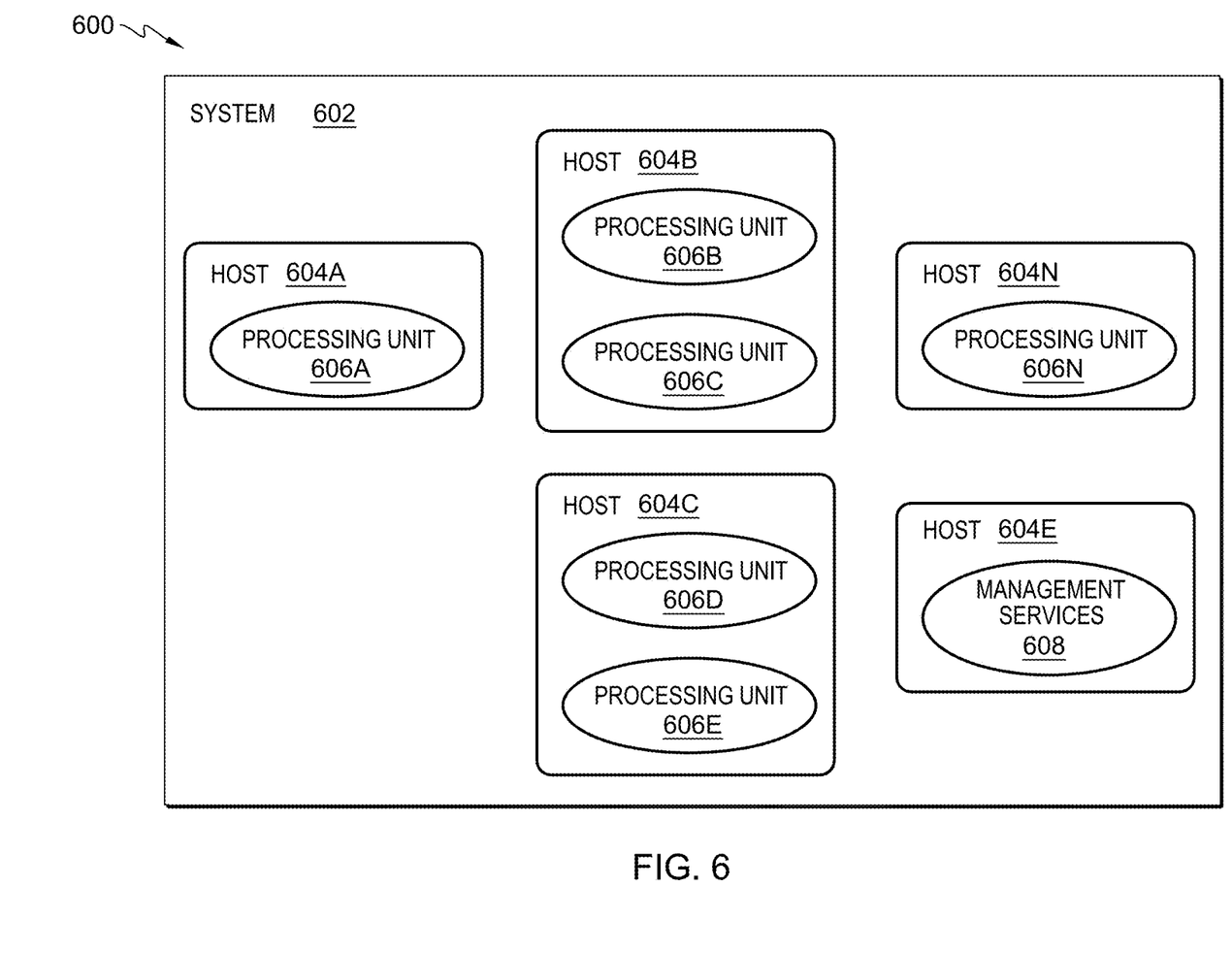
FIG. 6 is a diagram depicting an example of a traditional stream computing system, according to an embodiment of the present invention.

FIG. 6 shows diagram 600 depicting an example of a traditional stream computing system according to an embodiment of the present invention. In this embodiment, stream computing system 602 runs in a single managed environment (e.g., a single cloud, an onsite/private cloud deployment, and/or a set of managed hosts), where processing units 606A-N are placed within various hosts 604A-N (such as "stream processing instances," discussed above), and where placement and resource management are performed by management services 608. In this embodiment, the distributed technology is optimized to work well in the single managed environment, providing high availability and redundancy, for example.

However, while operating a stream computing system in a single, managed environment may have various benefits, the field of stream computing is moving to a world where applications run across several environments, where multiple cloud environments and deployment models will be used to optimally deploy and run stream computing applications. Existing stream computing system designs are not sufficient to meet this evolution of technology. For example, while it could be possible to write complex streaming applications that interact across multiple cloud environments, such work would be tedious and would require non-trivial development activities and management. What is needed is a solution that addresses the issues developers and administrators face when developing and deploying jobs in a stream computing environment that runs across several cloud environments.

Various embodiments of the present invention provide a novel approach to changing the distributed paradigm of stream computing systems from a single environment to a multi-cloud environment. In various embodiments, this approach includes several components: (i) consolidation—central management of stream computing jobs; (ii) problem determination—central problem determination tools for debugging streams jobs across several environments; (iii) high availability—expanding real time failover to multiple environments; and (iv) optimization—a machine learning-based solution based on time series performance data per environment, and on SLAs, to perform various core stream computing functionalities, including job submission (where should the streams application be initially deployed?), job relocation (are more optimal environments available to run the current job? If so, where?), and job parallelization (e.g., expanding parallel regions to multiple environments to handle spikes in workloads).

FIG. 7 shows diagram 700 depicting an example of a multi-cloud stream computing environment (i.e., stream computing system 702), according to an embodiment of the present invention. As shown in FIG. 7, stream processing instances 710A-C are hosted on cloud environment A 704, cloud environment B 706, and cloud environment C 708, respectively, and are managed by stream manager 712. In this embodiment, stream manager 712 provides a centralization of stream processing services and collects metadata from each stream processing instance 710A-C. Further, while stream manager 712 is depicted as being hosted outside of cloud environment A 704, cloud environment B 706, and cloud environment C 708, it should be recognized that in various embodiments, stream manager 712 can be hosted in any or all of cloud environment A 704, cloud environment B 706, and cloud environment C 708, with failover and/or other high available options available as well.

In various embodiments, stream computing applications can be deployed in a multi-cloud environment (such as stream computing system 702) in one (or both) of two different ways. In some embodiments, where a stream manager (such as stream manager 712) has been configured to provision services in the multi-cloud environment, the stream manager can select a cloud type and deploy a new stream processing instance of the selected type to a respective cloud environment. In other (or the same) embodiments, where stream processing instances can be created at the environment level, an administrator of a cloud environment within the multi-cloud environment can create a stream processing instance for the cloud environment, and the created stream processing instance can communicate with the stream manager to provide metadata about the stream processing instance's respective environment.

In various embodiments, stream processing instances are grouped into higher-level multi-cloud instances. For example, in these embodiments, metadata for the various running stream processing instances can be consolidated into a stream manager graphical user interface (GUI), where data is collected across the multiple stream processing instances and environments and presented in a single cloud view.

In various embodiments, stream computing jobs are submitted to a multi-cloud stream manager (such as stream manager 712). In these embodiments, the multi-cloud stream manager evaluates placement options as done in single cloud environments with the exception that instead of examining the metrics associated with a single cloud environment, it evaluates all registered cloud environments. Further, in these embodiments, jobs can be broken into processing elements containing operators and run while appearing to an end user or developer to be in a single environment.

In various embodiments, developers and administrators are able to view applications operating in a multi-cloud environment (such as stream computing system 702) from a single GUI. In these embodiments, although stream processing elements may be running in several different cloud environments, the single point of view provides a virtualized abstraction layer to optimize debug and development.

In various embodiments, a stream manager that provides centralized, remote administration of stream computing instances and job object across multiple clouds recognizes the following features, characteristics, and/or advantages: (i) it provides a single view of all instances, jobs, and processing elements, which can be grouped by user, region, vendor, type of cloud environment (private, public, etc.), and the like; (ii) it communicates with each stream processing instance and retrieves instance properties and information about running jobs and processing elements, which can then be consolidated and displayed with filters, groups, and sorts; (iii) it allows for each stream processing instance to register for event notifications, such as health alerts when instances or jobs become unhealthy according to various metrics; (iv) it allows for custom create, read, update, and delete (CRUD) operations across clouds, such as creating the same instance in clouds A and B, or retrieving unhealthy jobs for all instances in clouds A and B; and/or (v) it permits queries with predicates to be sent to instances across clouds, allowing for the retrieval of specific information and/or the sending of targeted commands.

Problem determination in multi-cloud environments can be significantly more challenging than in a single environment, as a multi-cloud environment may use a wide array different technologies in the underlaying infrastructure (various container technologies, virtual machines, physical hosts, and custom implementations). Information about the specific infrastructure of a cloud environment may be obtainable via application programming interface (API) calls.

Despite the variety of different technologies that may be employed in a multi-cloud environment, the underlaying failure detection within a stream computing application generally remains the same. For example, regardless of the infrastructure platform, stream computing applications can experience job fails, storage issues, network issues, bandwidth issues, and the like. Nonetheless, in each environment, debugging can be tedious, as an administrator must know which APIs to use, which tooling to load, and the like.

As such, various embodiments of the present invention consolidate the multiple cloud platform problem determination API technology to provide a single problem determination perspective. In various embodiments, issues are correlated with underlaying environmental problems (pulled from available APIs) and presented to the administrator or developer in a single view, as done in single environments, essentially virtualizing problem determination across multiple clouds.

In various embodiments, a stream manager (such as stream manager 712) can integrate with existing cloud and system monitoring tools to help determine possible causes when an instance or job becomes unhealthy. When a stream health alert is issued, for example, the stream manager can search and correlate with other alerts occurring at the time. In some cases, instances remaining unhealthy may be related to underlying issues such as a host being down, network partition issues, high memory/CPU, insufficient disk space, disk failure, and the like. For each instance or job, the stream manager gathers system information such as the hosts being used. When an instance or job becomes unhealthy, the streams manager can query the monitoring system and check for open alerts that might be related.

While existing stream processing systems may be built for high availability, this is typically limited to singular environments, as opposed to the multi-cloud environments. In addition, single environment systems are at risk of data center issues that could result in a stream processing job terminating or otherwise shutting down. Various embodiments of the present invention, which allow for multiple stream processing instances across multiple clouds, where a stream manager stores global configurations, job configurations, and applications bundles, allow for processing units/elements that are shut down to automatically restart in a different cloud environment, whether it be in a different cloud region with the same provider or another cloud provider altogether. By using data from consolidated problem determination, a scheduler can determine the most optimal cloud environment and instance to deploy the processing units/elements.

In various embodiments, if a cloud data center goes down, the stream manager can automatically move instances and jobs to a designated backup cloud environment. In these embodiments, instances can be created with the same configuration, and jobs can be restarted with application bundles from a global repository. When an instance is created or updated, its configuration settings are recorded with the stream manager so that the instance can be recreated in another environment. Similarly, during job submission, job configuration details and the application bundle are saved so that the application can be resubmitted in another instance if needed.

In various embodiments, a stream manager (such as stream manager 712) collects metrics from various cloud environments and instances across all cloud instances. In these embodiments, metrics on cloud specific performance, uptime, and failure rates are collected for jobs running in the various cloud environments. Using time series analysis of job types, attributes, and data, optimal placement decisions can be made, such as decisions currently made by the scheduler in a singular environment.

As described above, a stream manager may be configured to optimize: (i) job submission decisions, (ii) job movement decisions, and (iii) parallel region decisions for a multi-cloud stream computing environment. For example, in various embodiments, the stream manager trains a machine learning model to make optimal decisions based, at least in part, on data received from various cloud instances in the multi-cloud environment and on an analysis of that data.

In various embodiments, for optimizing job submission decisions ((i), above), the stream manager determines cost and throughput rates using data that has been consolidated from the various cloud instances using cloud specific APIs and stream processing APIs. In these embodiments, policies and SLAs can be established at the application level, and used in conjunction with the consolidated data to provide hints to the scheduler for optimal initial placement of jobs.

For example, if the same job runs on multiple clouds, the stream manager can collect metrics on pricing and throughput for comparison. Over time, the stream manager can learn to submit a job to the best environment to optimize cost and performance. The job submitter can also provide hints to the stream manager by specifying weights for factors such as cost and tuple throughput. The streams manager can calculate a composite score based on recent metrics and make the decision as to where the job gets submitted.

In various embodiments, for optimizing job movement decisions ((ii), above), the stream manager provides the capability to relocate jobs to the most optimal cloud environment at the most optimal time, using performance metrics and cost data consolidated from the different cloud environments. For example, one cloud environment may experience congestion at certain hours. Over time, the stream manager will recognize congestion patterns and provide hints to the scheduler to relocate the jobs to a more optimal cloud environment.

In an example, based on proximity to source data, the stream manager can automatically determine to move jobs to another cloud for optimal performance. For instance, a stream job processing real-time stock market data can move from a cloud in New York to a cloud in London, depending on when markets open. Job movement can be achieved by cancelling a job in one environment and submitting it in another. This can be a done on a fixed schedule, or be learned over time by examining the tuple rate of input data.

In various embodiments, parallel regions ((iii), above) are used in a stream processing system to expand and contract a stream job as need to handle spikes in data flow. In various embodiments, the stream manager uses data consolidated from the different cloud instances to identify parallel regions which can expand across multiple cloud instances.

For example, one of the advantages of having a hybrid cloud is the ability to run workloads in a private cloud, and scale out portions of a workload to a public cloud to handle spikes. To handle a period of heavier workloads, a stream manager can choose to increase the width of a parallel region in a job, and have new channels run in a public cloud with a greater pool of resources. After the peak time is over, the parallel region can be scaled back.

In various embodiments, when the stream manager determines to increase the width of a parallel region, the stream manager chooses a public cloud to run the new channels. New parallel channels are created by submitting an application that contains only operators in the region, for example. The input and output ports of the new channels are made accessible externally. The splitter and merger operators of the parallel region are adjusted to connect to the new channels.

As mentioned above, stream computing technology is typically tied to single deployed cloud environments, but the concept of expanding the technology across multiple clouds to take advantage of performance, reliability, high availability, and costs savings is the future of this distributed technology. Various embodiments of the present invention utilize a cloud manager that is integrated into common cloud environments and can be expanded (using APIs) to integrate into any data center or private cloud environment as needed. Various embodiments provide a virtualized architecture which allows stream computing applications to be developed as they are today, deployed as they are today, but run in a multi-cloud environment.

Various embodiments of the present invention use analytics and machine learning to determine the best cloud environments to run various streaming analytics jobs in a multi-cloud stream processing system. In various embodiments, parts of a stream job can be changed dynamically to run on a different cloud—for example, if more resources are needed to handle workload spikes.

In various embodiments, the stream manager of the stream processing system provides dynamic and elastic scaling, by determining which parts of a stream job are congested and parallelize only those regions. In other embodiments—for example, with content distribution services—the entire service can just be duplicated on another resource to scale. Furthermore, in various embodiments, the stream manager determines where to run processing units/elements to optimize cost and throughput for the job, as opposed to a generic resource load balancer, which only load-balances based on resource usage, or to a system that schedules resources based on priority.

In various embodiments, an administrator can configure which cloud environments are eligible to run additional processing units/elements.

Some embodiments of the present invention provide a system for executing stream computing workloads across multiple cloud environments in a multi-cloud system. The system comprises a plurality of cloud environments having respective stream computing instances, and a stream computing management node communicatively coupled to each of the stream computing instances of the cloud environments. The management node is configured to: (i) receive a stream computing job for processing, (ii) break the stream computing job into a plurality of processing elements, (iii) distribute the processing elements to respective stream computing instances for execution, and (iv) consolidate results from the distributed processing elements and provide the consolidated results to a user. In some embodiments, the management node is further configured to, in response to identifying that a first stream computing instance of a first cloud environment has failed, reassign the processing elements of the first stream computing instance to a second stream computing instance of a second cloud environment. In some embodiments, the management node is further configured to analyze metrics pertaining to each of the stream computing instances and dynamically distribute and/or move processing elements between stream computing instances based on the analyzing.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
  establishing, by a stream processing management node, data communication between the stream processing management node and a plurality of stream processing instances executing on respective computing environments in a multi-environment computing system;
  distributing, by the stream processing management node, one or more processing units of a stream processing job to a first set of stream processing instances of the plurality of stream processing instances;
  receiving, by the stream processing management node, from the one or more stream processing instances of the first set of stream processing instances, processing results associated with the one or more processing units of the stream processing job;
  training, by the stream processing management node, a machine learning model to select a stream management operation utilizing the received processing results as training data;
  selecting, by the machine learning model, a first stream management operation; and
  performing, by the stream processing management node, the first stream management operation.

2. The computer-implemented method of claim 1, wherein the first stream management operation includes distributing one or more processing units of a new stream processing job to a second set of stream processing instances of the plurality of stream processing instances based, at least in part, on the received processing results.

3. The computer-implemented method of claim 1, wherein the first stream management operation includes instructing movement of a first processing unit of the distributed one or more processing units from a first stream processing instance to a second stream processing instance based, at least in part, on the received processing results.

4. The computer-implemented method of claim 3, wherein the first stream management operation is further based, at least in part, on identifying that the first processing unit has been terminated by the first stream processing instance.

5. The computer-implemented method of claim 1, wherein the first stream management operation includes increasing a width of a parallel region associated with the stream processing job.

6. The computer-implemented method of claim 5, wherein increasing the width of the parallel region associated with the stream processing job includes instructing creation of one or more new channels associated with a processing unit to be executed on a third set of stream processing instances of the plurality of stream processing instances.

7. The computer-implemented method of claim 1, wherein the first stream management operation is further based, at least in part, on processing and/or memory requirements of the one or more processing units of the stream processing job.

8. The computer-implemented method of claim 1, wherein the multi-environment computing system is a multi-cloud system having cloud computing environments from at least two different cloud computing vendors.

9. A computer program product comprising one or more computer readable storage medium, or collectively media and program instructions collectively stored on the one or more computer readable storage medium, the stored program instructions executable by a stream processing management node, the stored program instructions comprising:
- program instructions to establish data communication between the stream processing management node and a plurality of stream processing instances executing on respective computing environments in a multi-environment computing system;
- program instructions to distribute one or more processing units of a stream processing job to a first set of stream processing instances of the plurality of stream processing instances;
- program instructions to receive, from the one or more stream processing instances of the first set of stream processing instances, processing results associated with the one or more processing units of the stream processing job;
- program instructions to train a machine learning model to select a stream management operation utilizing the received processing results as training data;
- program instructions to select, a first stream management operation using the machine learning model; and
- program instructions to perform the first stream management operation.

10. The computer program product of claim 9, wherein the first stream management operation includes distributing one or more processing units of a new stream processing job to a second set of stream processing instances of the plurality of stream processing instances based, at least in part, on the received processing results.

11. The computer program product of claim 9, wherein the first stream management operation includes instructing movement of a first processing unit of the distributed one or more processing units from a first stream processing instance to a second stream processing instance based, at least in part, on the received processing results.

12. The computer program product of claim 9, wherein the first stream management operation includes increasing a width of a parallel region associated with the stream processing job.

13. The computer program product of claim 9, wherein the multi-environment computing system is a multi-cloud system having cloud computing environments from at least two different cloud computing vendors.

14. A computer system comprising a stream processing management node having a processor set and a computer readable storage medium, wherein:
- the processor set is structured, located, connected and/or programmed to run program instructions stored on the computer readable storage medium; and
- the stored program instructions include:
  - program instructions to establish data communication between the stream processing management node and a plurality of stream processing instances executing on respective computing environments in a multi-environment computing system;
  - program instructions to distribute one or more processing units of a stream processing job to a first set of stream processing instances of the plurality of stream processing instances;
  - program instructions to receive, from the one or more stream processing instances of the first set of stream processing instances, processing results associated with the one or more processing units of the stream processing job;
  - program instructions to train a machine learning model to select a stream management operation utilizing the received processing results as training data;
  - program instructions to select, a first stream management operation using the machine learning model; and
  - program instructions to perform the first stream management operation.

15. The computer system of claim 14, wherein the first stream management operation includes distributing one or more processing units of a new stream processing job to a second set of stream processing instances of the plurality of stream processing instances based, at least in part, on the received processing results.

16. The computer system of claim 14, wherein the first stream management operation includes instructing movement of a first processing unit of the distributed one or more processing units from a first stream processing instance to a second stream processing instance based, at least in part, on the received processing results.

17. The computer system of claim 14, wherein the first stream management operation includes increasing a width of a parallel region associated with the stream processing job.

18. The computer system of claim 14, wherein the multi-environment computing system is a multi-cloud system having cloud computing environments from at least two different cloud computing vendors.

* * * * *